UNITED STATES PATENT OFFICE 2,464,806

WATER-SOLUBLE PHTHALOCYANINES CONTAINING QUATERNARY OR TERNARY SALT GROUPS AND SYNTHESIS THEREOF

Norman Hulton Haddock and Clifford Wood, Manchester, England, assignors to Imperial Chemical Industries Limited, a corporation of Great Britain No Drawing. Application December 4, 1945, Serial No. 632,786. In Great Britain December 6, 1944

13 Claims. (Cl. 260—314.5)

This invention relates to the manufacture of new water-soluble phthalocyanine derivatives and more particularly it relates to phthalocyanine derivatives which contain quaternary or ternary salt groups and are blue or green dyestuffs suitable for dyeing textile materials.

According to the invention we manufacture new water-soluble phthalocyanine derivatives by a process which comprises treating a phthalocyanine containing at least two chloro- or bromo-methyl groups by known methods for replacing the chlorine or bromine atoms thereof by quaternary or ternary salt groups.

The new water-soluble phthalocyanine derivatives are thus compounds of the formula $R(CH_2X)_n$ wherein R is a substituted or unsubstituted metal- or metal-free phthalocyanine nucleus, X is a ternary or quaternary salt group and $n$ is a number greater than 1.

The phthalocyanine derivatives containing at least two chloro- or bromo-methyl groups may be made, as is described in copending application Ser. No. 653,956, now U. S. Patent 2,435,307, by heating a metal or metal-free substituted or unsubstituted phthalocyanine with aluminum chloride and a substance which is either of itself a chloromethylating or bromomethylating agent, for instance symmetrical dichloromethyl or dibromomethyl ether, or with a substance which acts as a chloromethylating agent in presence of aluminum chloride, for instance paraformaldehyde. The heating is preferably carried out in the further presence of a tertiary amine which is not itself susceptible of chloro- or bromomethylation, as typified by triethylamine and pyridine.

Suitable phthalocyanine derivatives for use in the process of the invention include, for example, copper tri-(chloromethyl)phthalocyanine, copper tetra-(chloromethyl)phthalocyanine, tri-(chloromethyl)phthalocyanine, copper tri-(chloromethyl)-octa-3:6-chlorophthalocyanine, copper tetra-(chloromethyl)-tetra-4-benzoylphthalocyanine and copper tri-(bromomethyl)phthalocyanine.

The chlorine or bromine atoms of the chloro- or bromo-methyl derivatives of phthalocyanine are replaced by quaternary or ternary salt groups as said by known means. These include for example—

(1) Heating the chloro- or bromo-methyl derivative with a tertiary amine to convert it to a quaternary ammonium salt. Suitable tertiary amines for this purpose include for example pyridine, hexahydrodimethyl-aniline, triethylamine, and diethylaminoethyl alcohol.

(2) Causing the chloro- or bromo-methyl derivative to react with an alkali metal derivative of a mercaptan of the formula RSH wherein R may be a substituted or unsubstituted alkyl, cycloalkyl, aralkyl or aryl radical, thus replacing the chlorine or bromine atoms by RS— radicals, and then treating the so-obtained sulphide with such an ester as is known to convert sulphides into ternary sulphonium salts, for example with dimethyl-sulphate or methyl p-toluenesulphonate. Suitable mercaptans which may be used in this process include, for example, methyl mercaptan, n-butyl mercaptan, cyclo-hexyl mercaptan, benzyl mercaptan, thiophenol and p-thiocresol.

(3) Causing the chloro- or bromo-methyl derivative to react with a thiourea containing at least one hydrogen atom directly attached to nitrogen so as to convert it into an isothiouronium salt. Suitable thioureas which may be used for this purpose include thiourea, N-methyl-thiourea, N-phenylthiourea, N:N'-dimethylthiourea, N:N-dimethylthiourea, and N:N:N'-trimethylthiourea.

(4) Causing the chloro- or bromo-methyl derivative to react with tetramethyl thiourea.

The new phthalocyanine derivatives containing at least two quaternary or ternary salt groups are soluble in water giving bright blue or green solutions from which cotton or other textile material is dyed in bright blue or green shades of very good fastness to washing treatments and to light. In the case of some of the new phthalocyanine derivatives it is advantageous to assist solution in water for example by addition of suitable surface tension reducing agents. We have found that condensation products of β-naphthol and ethylene oxide are particularly suitable for this purpose. It is a further feature of the invention to use these quaternary and ternary salts as dyestuffs.

The invention is illustrated but not limited by the following examples in which parts are by weight.

Example 1

10 parts of copper tri-(chloromethyl)phthalocyanine (made by reacting copper phthalocyanine with symdichlorodimethyl ether at 60° C. in the presence of aluminium chloride and triethylamine, as described in Example 1 of copending application Ser No. 653,956, now U. S. Patent 2,435,307) and 100 parts of β-ethoxyethanol are milled during 16 hours with 80 parts of coarse gravel in a bottle rotating at about 150 revolutions per minute. The fine suspension so obtained is separated from the gravel and a solution of 14.6 parts of sodium methyl mercaptide in 100 parts of ethyl alcohol is added. The temperature of the mixture is raised to 100° C. during 1 hour, some of the alcohol being thereby distilled. The bright blue suspension remaining is filtered, the residual solid is washed with ethyl alcohol and then with water. A bright blue powder is obtained which consists of copper tri-(methylmercaptomethyl) phthalocyanine.

The so-obtained copper tri-(methylmercaptomethyl) phthalocyanine (10 parts) and 65 parts of dimethyl sulphate are heated together at 90° C. during 15 minutes. The mixture is then cooled and 150 parts of acetone are added and the suspended blue solid is filtered off and washed with acetone. The solid residue is dried by exposure and consists of a bright blue powder which may be named copper-phthalocyanine-tri-(methylene - methylsulfonium-methosulfate); it is readily soluble in water, giving a bright blue solution which dyes cotton in bright blue shades of excellent fastness to washing and to light.

Example 2

10 parts of copper tri-(chloromethyl) phthalocyanine and 50 parts of tetramethylthiourea are heated together at 110° C. during 10 minutes, the mixture is cooled and 100 parts of acetone are added and the bright blue suspended solid is filtered off, washed with acetone and dried by exposure. A bright blue powder is thus obtained. It dissolves readily in water to give a bright blue solution and this solution dyes cotton in bright blue shades of good fastness to washing and to light.

Example 3

10 parts of finely-powdered copper tri-(chloromethyl) phthalocyanine are mixed with 100 parts of dry pyridine and the mixture is heated to boiling during 10 minutes. The resulting bright blue suspension is cooled, an equal volume of acetone is added thereto and the mixture is filtered. The filter-cake is washed with acetone until free from pyridine and is then dried by exposure. A bright blue powder is obtained which dissolves readily in water to a greenish-blue solution and the solution dyes cotton in bright greenish-blue shades.

Example 4

A mixture of 5 parts of copper tri-(chloromethyl) phthalocyanine, 12 parts of tetramethylthiourea and 12 parts of water is heated at 95°-100° C. during 10 minutes. The deep blue solution so obtained is cooled and diluted with 50 parts of acetone, and the bright blue solid which is precipitated is filtered off, washed with acetone and dried by exposure. It is a bright blue powder, similar in properties to the product described in Example 2.

Example 5

A mixture of 7.2 parts of copper tri-(chloromethyl) phthalocyanine, 13.8 parts of thiourea and 30 parts of water is boiled for 10 minutes. The clear blue solution thus formed is cooled and poured into 100 parts of acetone. The resulting bright blue suspension is filtered and the filter-cake washed with acetone and dried by exposure. A bright blue powder is obtained which dissolves readily in water to give a greenish-blue solution, and the solution dyes cotton in bright greenish-blue shades.

Example 6

In place of the 13.8 parts of thiourea employed in Example 5 there are used 16.2 parts of N-methylthiourea. A bright blue powder, similar in properties to that described in Example 5, is obtained.

Example 7

In place of the 13.8 parts of thiourea employed in Example 5 there are used 18.7 parts of N:N'-dimethylthiourea. A bright blue powder, similar in properties to that described in Example 5, is obtained.

Example 8

In place of the 13.8 parts of thiourea employed in Example 5 there are used 7.1 parts of N:N:N'-trimethylthiourea. A bright blue powder similar in properties to that described in Example 5, is obtained.

Example 9

A mixture of 7.2 parts of copper tri-(chloromethyl) phthalocyanine, 30 parts of benzyl alcohol and 4.6 parts of triethylamine is heated at 90°-100° C. during 15 minutes. It is then diluted with 200 parts of acetone and the so precipitated solid is filtered off and washed with acetone. It is then dried and a bright blue powder is obtained which does not dissolve readily in water. The powder dissolves readily in a dilute aqueous solution of a substance obtained by condensing β-naphthol with 10 molecular proportions of ethylene oxide. The deep greenish-blue solution so obtained dyes cotton in bright greenish-blue shades.

Example 10

In place of the 4.6 parts of triethylamine employed in Example 9 there are used 5.7 parts of N:N-dimethylcyclohexylamine. The bright blue powder thus obtained is readily soluble in water to give a solution which dyes cotton in bright blue shades.

Example 11

A mixture of 5 parts of copper tri-(chloromethyl) phthalocyanine and 50 parts of β-diethylaminoethanol is boiled during 5 minutes. The mixture is then cooled and diluted with 200 parts of acetone. The precipitated blue solid is filtered off, washed with acetone and dried by exposure. The blue powder thus obtained dissolves in water to give a greenish-blue solution and this solution dyes cotton in greenish-blue shades.

Example 12

A mixture of 7.5 parts of copper tri-(methylmercaptomethyl) phthalocyanine, made as described in Example 1, and 37.2 parts of methyl p-toluenesulphonate is heated at 130°-135° C. during 20 minutes. The blue mixture is cooled and diluted with 200 parts of acetone. The precipitated blue solid is filtered off, washed with acetone and dried by exposure. The bright blue powder thus obtained does not dissolve readily in water. The powder is mixed with an equal part of a substance obtained by condensing β-naphthol with 10 molecular proportions of ethylene oxide and the mixture so obtained dissolves readily in water, giving a bright blue solution. This solution dyes cotton in bright blue shades.

Example 13

In place of the 10 parts of copper tri-(chloromethyl) phthalocyanine employed in Example 1, there are used 10 parts of copper tetra-(chloromethyl) phthalocyanine (made by reacting copper phthalocyanine with sym-dichlorodimethyl ether at 85°-90° C. in the presence of aluminium chloride and triethylamine as described in Example 3 of copending application Ser. No. 653,956). In this way there is obtained a greenish-blue powder, which dissolves readily in water to give a greenish-blue solution, and this solution dyes cotton in bright greenish-blue shades.

Example 14

In place of the 5 parts of copper tri-(chloromethyl)phthalocyanine employed in Example 4 there are used 5 parts of copper di-(chloromethyl)phthalocyanine (made by reacting copper phthalocyanine with sym-dichlorodimethyl ether at 60° C. in the presence of aluminium chloride, as described in Example 2 of copending application Ser. No. 653,956). In this way there is obtained a blue powder, which dissolves in water to give a blue solution, and this solution dyes cotton in bright blue shades.

Example 15

16.4 parts of a mixture of copper penta-(chlormethyl)phthalocyanine and copper hexa-(chloromethyl)phthalocyanine (made by reacting copper phthalocyanine with sym-dichlorodimethyl ether at 65°–67° C. in the presence of aluminium chloride and pyridine, as described in Example 12 of copending application Ser. No. 653,956) and 200 parts of β-ethoxyethanol are milled during 16 hours with 200 parts of coarse gravel in a bottle rotating at about 150 revolutions per minute. The fine suspension so obtained is separated from the gravel and 75 parts of benzylmercaptan are added. A solution obtained by dissolving 12.8 parts of sodium in 115 parts of β-ethoxyethanol is then added. This treatment converts the benzylmercaptan in situ into sodium-benzylmercaptide. The mixture is heated to 100° C. during 1 hour, and the temperature is maintained at 100° C. during 15 minutes. The bright blue suspension is filtered, and the residual solid is washed first with ethyl alcohol and then with water, and dried at 100° C. A bright blue solid is obtained which is a mixture of copper penta-(benzylmercaptomethyl)phthalocyanine and copper hexa-(benzylmercaptomethyl)phthalocyanine.

The above product is mixed with 100 parts of dimethyl sulphate and the mixture is heated at 90–100° C. during 15 minutes. It is then cooled and 200 parts of acetone are added. The suspended blue solid is filtered off, washed with acetone, and dried by exposure. A greenish-blue powder is obtained which dissolves in water to give a greenish-blue solution. This solution dyes cotton in bright greenish-blue shades.

Example 16

In place of the 75 parts of benzylmercaptan employed in Example 15 there are employed 75 parts of p-thiocresol. The product is a greenish-blue powder which does not dissolve readily in water. The powder is mixed with an equal part of a substance obtained by condensing β-naphthol with 10 molecular proportions of ethylene oxide and the mixture so obtained dissolves readily in water, to give a greenish-blue solution which dyes cotton in bright greenish-blue shades.

Example 17

In place of the 10 parts of copper tri-(chloromethyl)phthalocyanine employed in Example 1, there are used 10 parts of copper tetra-(chloromethyl)tetra-4-benzoylphthalocyanine (made by reacting copper tetra-4-benzoylphthalocyanine with sym-dichlorodimethyl ether in the presence of aluminium chloride and triethylamine as described in Example 9 of copending application Ser. No. 653,956). In this way there is obtained a bright greenish-blue powder. It dissolves in water to give a greenish-blue solution which dyes cotton in bright greenish-blue shades.

Example 18

In place of the 5 parts of copper tri-(chloromethyl)phthalocyanine employed in Example 4, there are used 5 parts of copper octa-(chloromethyl)-tetra-4-phenylphthalocyanine (made by reacting copper tetra-4-phenylphthalocyanine with sym-dichlorodimethyl ether in the presence of aluminium chloride, as described in Example 10 of copending application Ser. No. 653,956). The product is a bright green powder which dissolves in water to give a bright yellowish-green solution. This solution dyes cotton in bright yellowish-green shades.

Example 19

10 parts of copper tetra-(chloromethyl)-tetra-4-phenylphthalocyanine (made by reacting copper tetra-4-phenylphthalocyanine with sym-dichlorodimethyl ether in the presence of aluminium chloride and nitrobenzene, as described in Example 13 of copending application Ser. No. 653,956) and 100 parts of pyridine are boiled with stirring during 10 minutes. 60 parts of water are added to the bright green suspension and the mixture is boiled for a further 5 minutes. The bright green solution so obtained is cooled and diluted with 400 parts of acetone, and the green solid which separates is filtered off, washed with acetone, and dried by exposure. A bright green powder is obtained which dissolves readily in water to give a bright yellowish-green solution. This solution dyes cotton in bright yellowish-green shades.

Example 20

In place of the 10 parts of copper tri-(chloromethyl)phthalocyanine employed in Example 1 there are used 10 parts of a mixture of nickel di-(chloromethyl)phthalocyanine and nickel tri-(chloromethyl)phthalocyanine (made by reacting nickel phthalocyanine with sym-dichlorodimethyl ether in the presence of aluminium chloride and triethylamine, as described in Example 7 of copending application Ser. No. 653,956). The product is a greenish-blue powder which dissolves readily in water, to give a greenish-blue solution which dyes cotton in bright greenish-blue shades.

Example 21

In place of the 10 parts of copper tri-(chloromethyl)phthalocyanine employed in Example 3 there are used 10 parts of copper tri-(bromomethyl) phthalocyanine (made by reacting copper phthalocyanine with sym-dibromodimethyl ether in the presence of aluminium chloride and triethylamine, as described in Example 6 of the copending application Ser. No. 653,956). The product is a bright blue powder which dissolves readily in water to a greenish-blue solution and the solution dyes cotton in bright greenish-blue shades.

Example 22

In place of the 10 parts of copper tri-(chloromethyl)phthalocyanine employed in Example 3 there are used 10 parts of metal-free tri-(chloromethyl) phthalocyanine (made by reacting metal-free phthalocyanine with sym-dichlorodimethyl ether in the presence of aluminium chloride and triethylamine, as described in Example 8 of copending application Ser. No. 653,956). A bright greenish-blue powder is obtained which dissolves readily in water to a greenish-blue solution which dyes cotton in bright greenish-blue shades.

*Example 23*

In place of the 75 parts of benzylmercaptan employed in Example 15 there are used 70 parts of cyclohexyl mercaptan. A bright blue powder is obtained which dissolves readily in water to give a bright blue solution which dyes cotton in bright blue shades.

*Example 24*

In place of the 75 parts of benzylmercaptan employed in Example 15 there are used 54 parts of butyl mercaptan. A bright blue powder is obtained which dissolves readily in water to give a solution which dyes cotton in bright blue shades.

The structure of the novel compounds obtained according to this invention is typified by that of the product obtained in Example 1 above

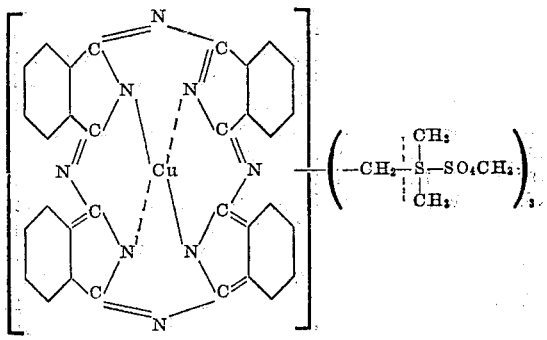

For the purpose of the claims below, the portion of the molecule within the square brackets will be referred to as "the fundamental phthalocyanine complex," and the benzene rings of the same will be designated as the "fundamental phenylene nuclei" or as the "phenylene nuclei of the fundamental phthalocyanine complex" to distinguish them from any pendant benzene rings, for instance the benzene rings of the benzoyl radicals in Example 17. In the case of nickel-phthalocyanine, metal-free phthalocyanine, etc., the Cu atom at the center is replaced by Ni, two H-atoms, etc.

The portion of the molecule in the parenthesis represents the methylene-sulfonium salt radical. In some of the other examples hereinabove, the methylene sulfonium salt radical is replaced by a methylene quaternary ammonium salt radical typified by

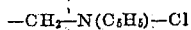

(the methylene-pyridinium chloride radical) or by a methylene isothiouronium salt radical, as illustrated by the methylene-(tetramethyl-thiouronium chloride) radicals in the product of Example 4, which may be graphically represented as follows:

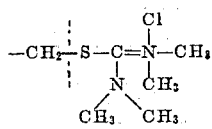

In all these cases, the "onium salt radical" mentioned in the claims shall be understood as embracing that portion in each of the above radicals which is to the right of the $CH_2$ group, as indicated by the vertical dotted lines in the above formulas.

Finally, the expression "quaternary ammonium" when referring to a compound or radical in the claims below shall be understood as a generic phrase to include noncyclic ammonium salts as well as pyridinium and similar heterocyclic nitrogenous base compounds.

We claim:

1. A phthalocyanine compound selected from the group consisting of metal-phthalocyanine and metal-free phthalocyanines, and characterized by bearing in the phenylene nuclei of the fundamental phthalocyanine complex at least two radicals of the type —$CH_2X$, wherein X designates an onium salt radical selected from the group consisting of the sulfonium, isothiouronium and quaternary ammonium salts of water-soluble acids.

2. Water-soluble phthalocyanine compounds of the general formula $R—(CH_2X)n$, wherein R represents the molecule of a metal phthalocyanine compound to which the ($CH_2X$) radicals above shown are attached in its fundamental phenylene nuclei, $n$ being a numeral greater than 1, while X is an onium salt radical selected from the group consisting of the sulfonium, isothiouronium and quaternary ammonium salts of water-soluble acids.

3. A copper phthalocyanine compound characterized by bearing in the phenylene nuclei of the fundamental phthalocyanine complex at least two radicals of the type —$CH_2X$, wherein X designates an onium salt radical selected from the group consisting of the sulfonium, isothiouronium and quaternary ammonium salts of water-soluble acids.

4. A copper phthalocyanine compound characterized by bearing in the phenylene nuclei of the fundamental phthalocyanine complex at least two methylene-ternary-sulfonium salt radicals of a water-soluble acid.

5. A copper phthalocyanine compound characterized by bearing in the phenylene nuclei of the fundamental phthalocyanine complex at least two methylene-isothiouronium halide radicals.

6. A copper phthalocyanine compound characterized by bearing in the phenylene nuclei of the fundamental phthalocyanine complex at least two methylene-quaternary ammonium halide radicals.

7. A copper phthalocyanine compound characterized by bearing in the phenylene nuclei of the fundamental phthalocyanine complex at least two methylene-pyridinium halide radicals.

8. A copper phthalocyanine compound characterized by bearing in the phenylene nuclei of the fundamental phthalocyanine complex at least two methylene-sulfonium radicals of the formula

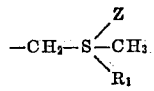

wherein $R_1$ is a radical selected from the group consisting of alkyl, aralkyl and aryl, while Z is an acid radical selected from the group consisting of methyl-sulfuric and para-toluene-sulfonic.

9. A copper phthalocyanine compound characterized by bearing in the phenylene nuclei of the fundamental phthalocyanine complex at least two methylene-dimethylsulfonium methyl sulfate radicals.

10. Copper - phthalocyanine - tri(methylene-methylsulfonium-methosulfate).

11. A process for producing water-soluble derivatives of compounds of the phthalocyanine series, which comprises reacting a phthalocyanine compound bearing at least two side chains selected from the group consisting of $CH_2Cl$ and $CH_2Br$ with an alkali-metal salt of a mercaptan selected from the group consisting of alkyl, aralkyl and aryl mercaptans, and then subjecting the intermediate thus obtained to reaction with a methyl ester, whereby to convert the mercaptide radical into a ternary sulfonium salt radical.

12. A process for producing water-soluble derivatives of a copper-phthalocyanine compound, which comprises reacting a copper phthalocyanine which bears at least two $CH_2Cl$ radicals in the phenylene nuclei of the fundamental phthalocyanine complex with sodium methyl mercaptide, whereby to replace the Cl atoms in said $CH_2Cl$ radicals by $S—CH_3$ radicals, and then further subjecting the intermediate thiomethyl ether thus obtained to reaction with dimethyl sulfate whereby to convert the thiomethyl radicals into methyl-sulfonium-methosulfate groups.

13. The process of producing a water-soluble dyestuff of the phthalocyanine series, which comprises reacting copper-tri(chloromethyl)-phthalocyanine with sodium-methyl mercaptide, and then reacting upon the intermediate thiomethyl ether thus obtained with dimethyl sulfate, whereby to produce copper-phthalocyanine-tri-(methylene-methylsulfonium-methosulfate).

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,285,359 | Rosch et al. | June 2, 1942 |
| 2,290,906 | Coffey et al. | July 28, 1942 |
| 2,309,691 | Brannon | Feb. 2, 1943 |